United States Patent
Yamazaki

(10) Patent No.: US 10,053,591 B2
(45) Date of Patent: Aug. 21, 2018

(54) INK SET AND DUPLEX PRINTING METHOD

(71) Applicant: Seiko Epson Corporation, Tokyo (JP)

(72) Inventor: Soichi Yamazaki, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/168,718

(22) Filed: May 31, 2016

(65) Prior Publication Data
US 2016/0376456 A1 Dec. 29, 2016

(30) Foreign Application Priority Data
Jun. 26, 2015 (JP) .................. 2015-128360

(51) Int. Cl.
*C09D 11/322* (2014.01)
*C09D 11/40* (2014.01)
*C09D 11/38* (2014.01)

(52) U.S. Cl.
CPC ............ *C09D 11/40* (2013.01); *C09D 11/322* (2013.01); *C09D 11/38* (2013.01)

(58) Field of Classification Search
CPC ........ C09D 11/40; C09D 11/38; C09D 11/322
See application file for complete search history.

(56) References Cited

U.S. PATENT DOCUMENTS

| | | | | |
|---|---|---|---|---|
| 7,402,200 B2* | 7/2008 | Imai | ...... | C09D 11/54 106/31.27 |
| 7,758,684 B2* | 7/2010 | Mizusaki | ...... | C09D 11/38 106/31.58 |
| 2009/0258146 A1* | 10/2009 | Saito | ...... | B41M 5/0023 427/256 |
| 2011/0169889 A1* | 7/2011 | Kojima | ...... | C09D 11/40 347/20 |
| 2013/0281593 A1* | 10/2013 | Yamazaki | ...... | C09D 11/38 524/377 |
| 2014/0055520 A1* | 2/2014 | Inumaru | ...... | C09D 11/322 347/21 |
| 2017/0051170 A1* | 2/2017 | Nakagawa | ...... | C09D 11/38 |

FOREIGN PATENT DOCUMENTS

| | | | |
|---|---|---|---|
| JP | 2006-256289 A | 9/2006 | |
| JP | 2012-183798 A | 9/2012 | |
| KR | 20150075359 A | * 3/2015 | ............ C09D 11/38 |

* cited by examiner

*Primary Examiner* — Julian Huffman
*Assistant Examiner* — Michael Konczal
(74) *Attorney, Agent, or Firm* — Harness, Dickey & Pierce, P.L.C.

(57) ABSTRACT

According to the invention, there is provided an ink set which contains at least one ink selected from a group of a black pigment ink, a self-dispersing color pigment ink, and a resin-dispersion color pigment ink. The moisture quantity of the black pigment ink is from 68 mass % to 75 mass %. The moisture quantity of the self-dispersing color pigment ink is from 62 mass % to 72 mass %. The moisture quantity of the resin-dispersion color pigment ink is from 68 mass % to 75 mass %.

6 Claims, 1 Drawing Sheet

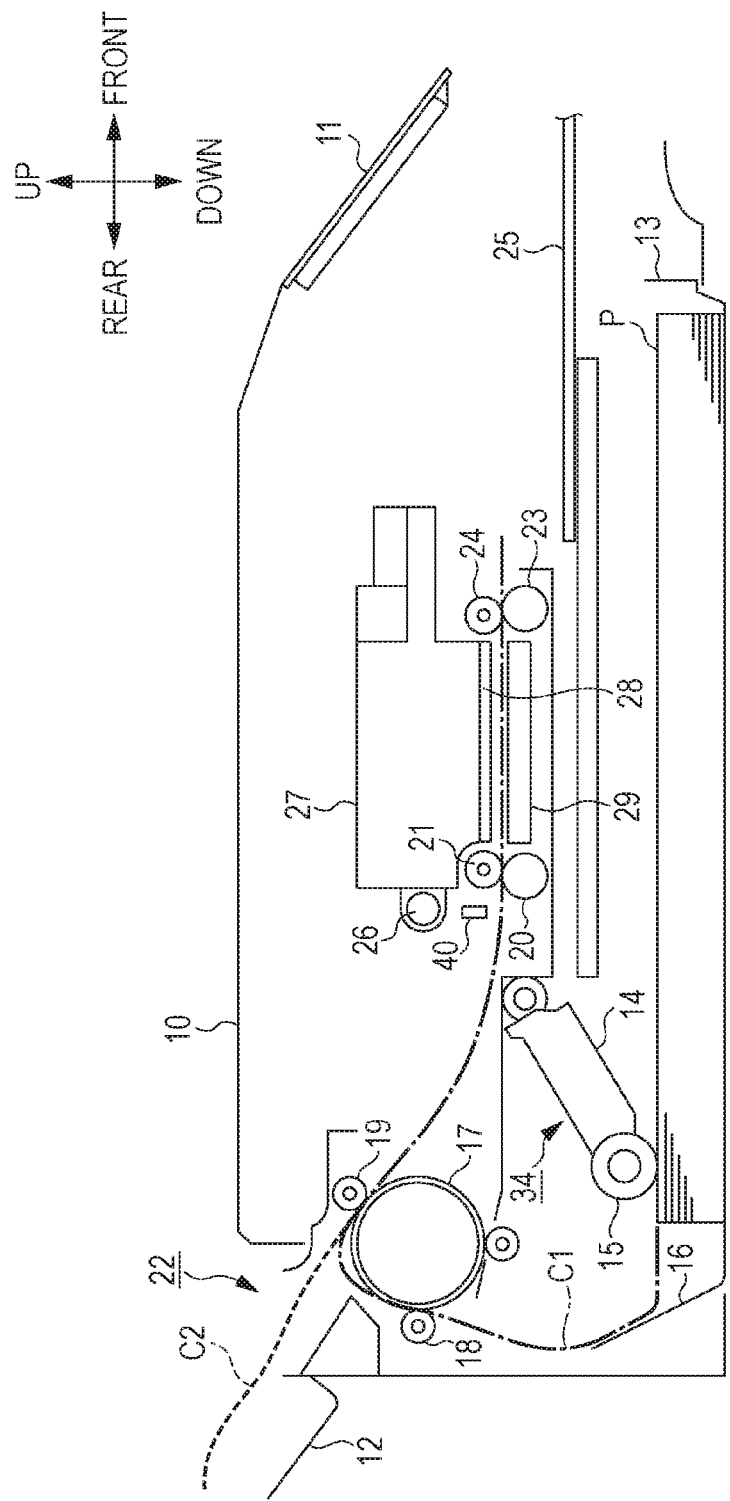

INK SET AND DUPLEX PRINTING METHOD

BACKGROUND

1. Technical Field

The present invention relates to an ink set and a duplex printing method.

2. Related Art

Speeding-up of an ink jet recording method using an aqueous ink has been developed. Among technologies for the speeding-up, a line type ink jet printer which uses a line head as a recording head has a printing speed of about 100 pages/minute and can perform high density printing.

However, the line type ink jet printer easily performs high-speed simplex printing, but speeding-up of duplex printing is difficult mainly due to two problems. A first problem is that moisture contained in an ink causes sheet deformation such as curling or cockling to occur on a sheet after simplex printing, clogging of a sheet transported on a sheet transporting path (occurrence of paper jam) causes sheet transporting to be difficult. A second problem is that infiltration or evaporation of an aqueous ink to a sheet takes time, and thus the ink may be transferred to a sheet transporting mechanism such as a sheet feeding roller. With such problems, in the line type ink jet printer using an aqueous ink, the speed of duplex printing is significantly slow, that is, only 2 pieces/minute to 3 pieces/minute, and thus realization of a duplex printing speed such as the speed of a laser printer is difficult.

Thus, for example, JP-A-2012-183798 discloses a technology as follows. That is, in a case where a picture, a drawing, and the like are printed on plain paper at a high speed by using the ink jet recording apparatus, a large amount of an ink adheres to the plain paper, and thus sufficient suppression of the occurrence of the curling after recording is not possible. In order to solve such problem, a heating section is provided in a liquid ejecting apparatus and a first surface of a sheet is dried. Thus, a predetermined difference is provided between the moisture quantity of the first surface of the sheet and the moisture quantity of the second surface of the sheet, and an aqueous liquid is ejected and is adhered to the dried first surface of the sheet.

For example, JP-A-2006-256289 discloses a technology as follows. That is, in order to provide an ink jet printing device in which duplex printing is performed without a reversing mechanism of a printing medium or a transfer medium, ink jet type recording heads are disposed over both surfaces of a printing medium which is transported vertically to a simple downward path from the top of the device, and duplex printing is performed by using a quick-drying aqueous ink which has high viscosity.

However, in a case where a drying process for high-speed printing is provided, a waiting period until infiltration is completed is provided, or printing is simultaneously performed on both surfaces, mechanical efforts are required. In a case where an aqueous ink having a large moisture quantity is used, suppression of cockling after printing, or suppression of the occurrence of permanent curling of the ejected sheet is difficult and speeding-up of the duplex printing by improving sheet transporting properties is difficult. In a case where a high-viscosity ink having a small moisture quantity is used, the ink is rapidly dried, but infiltration to a sheet is slow. Thus, speeding-up of the duplex printing is difficult.

In this manner, it is difficult that infiltration of an ink to a sheet or drying of the ink is completed in a second unit. Particularly, if printing is performed on the back surface just after printing is performed on the front surface for the purpose of high-speed duplex printing, back surface printing is started in a state where the infiltration of the ink to the front surface is not completed. Thus, a problem in that the ink is transferred to the sheet transporting mechanism such as a sheet feeding roller, the ink is transferred to the sheet again, and thus the sheet is stained with the ink occurs.

SUMMARY

An advantage of some aspects of the invention is to provide an ink set and a duplex printing method in which transfer of an ink to a sheet transporting member is suppressed, sheet transporting properties are improved, and thus speeding-up of duplex printing is caused to be possible.

The invention can be realized in the following aspects or application examples.

Application Example 1

According to an aspect of the invention, there is provided an ink set which contains at least one ink selected from a group of a black pigment ink, a self-dispersing color pigment ink, and a resin-dispersion color pigment ink. A moisture quantity of the black pigment ink is from 68 mass % to 75 mass %. A moisture quantity of the self-dispersing color pigment ink is from 62 mass % to 72 mass %. A moisture quantity of the resin-dispersion color pigment ink is from 68 mass % to 75 mass %.

According to Application Example 1, the moisture quantities of the inks constituting the ink set are adjusted, and thus it is possible to provide an ink set which can suppress occurrence of transfer of the ink and deformation of a sheet, and can cause a speed of duplex printing to be increased.

Application Example 2

In the ink set according to Application Example 1, each of the black pigment ink, the self-dispersing color pigment ink, and the resin-dispersion color pigment ink may contain three or more types of acetylene glycol-based surfactants selected from a group of acetylene glycol and an ethylene oxide adduct of acetylene glycol, the total content of the acetylene glycol-based surfactants may be from 0.1 mass % to 3 mass % with respect to the total mass of each of the black pigment ink, the self-dispersing color pigment ink, and the resin-dispersion color pigment ink.

Application Example 3

In the ink set according to Application Example 1 or Application Example 2, the ink set may be used for a duplex-printing ink jet recording apparatus.

Application Example 4

In the ink set according to any one example of Application Example 1 to Application Example 3, the total viscosity of the black pigment ink, the self-dispersing color pigment ink, and the resin-dispersion color pigment ink may be from 2.0 mm$^2$/s to 4.0 mm$^2$/s.

Application Example 5

In the ink set according to any one example of Application Example 1 to Application Example 4, each of the black pigment ink, the self-dispersing color pigment ink, and the resin-dispersion color pigment ink may further contain alkylene glycol monoalkyl ether.

Application Example 6

In the ink set according to any one example of Application Example 1 to Application Example 5, each of the black pigment ink, the self-dispersing color pigment ink, and the resin-dispersion color pigment ink may further contain 1,2-alkane diol.

Application Example 7

In the ink set according to any one example of Application Example 1 to Application Example 6, each of the black pigment ink, the self-dispersing color pigment ink, and the resin-dispersion color pigment ink may further contain trimethylglycine.

Application Example 8

According to another aspect of the invention, there is provided an ink set. A moisture quantity of a black pigment ink is from 68 mass % to 75 mass %. A moisture quantity of a self-dispersing color pigment ink is from 62 mass % to 72 mass %. A moisture quantity of a resin-dispersion color pigment ink is from 68 mass % to 75 mass %.

Application Example 9

In the ink set according to any one example of Application Example 1 to Application Example 8, the black pigment ink may be formed from a self-dispersing pigment.

Application Example 10

According to still another aspect of the invention, there is provided a duplex printing method of performing duplex printing by using an ink jet recording apparatus. The ink jet recording apparatus includes an ink set and a sheet transporting mechanism. The ink set contains at least one selected from a group of a black pigment ink, a self-dispersing color pigment ink, and a resin-dispersion color pigment ink. A moisture quantity of the black pigment ink is from 68 mass % to 75 mass %. A moisture quantity of the self-dispersing color pigment ink is from 62 mass % to 72 mass %. A moisture quantity of the resin-dispersion color pigment ink is from 68 mass % to 75 mass %. In the sheet transporting mechanism, a period from when printing on a front surface is started, until printing on a back surface is started is within three seconds.

Application Example 11

In the duplex printing method according to Application Example 10, a duplex printing speed (page/minute) in printing a solid image on the entirety of a surface of plain paper may be from 30% of a simplex printing speed, to 100% thereof.

Application Example 12

In the duplex printing method according to Application Example 10 or Application Example 11, the black pigment ink may be formed from a self-dispersing pigment.

BRIEF DESCRIPTION OF THE DRAWINGS

The invention will be described with reference to the accompanying drawings, wherein like numbers reference like elements.

FIGURE is a schematic diagram illustrating a side sectional structure of an ink jet recording apparatus used in an embodiment.

DESCRIPTION OF EXEMPLARY EMBODIMENTS

Hereinafter, preferred embodiments will be described. The embodiments which will be described below are used for describing an example of the invention. The invention is not limited to the following embodiments and may include various modification examples conducted in a range without changing from the gist of the invention.

1. Ink Set

An ink set according to an embodiment of the invention contains at least one selected from a group of a black pigment ink, a self-dispersing color pigment ink, and a resin-dispersion color pigment ink. A moisture quantity of the black pigment ink is from 68 mass % to 75 mass %. A moisture quantity of the self-dispersing color pigment ink is from 62 mass % to 72 mass %. A moisture quantity of the resin-dispersion color pigment ink is from 68 mass % to 75 mass %. The ink set is mounted, for example, in an ink jet recording apparatus which includes a sheet transporting mechanism (which will be described later) in which a period from when printing on a front surface is started, until printing on a back surface is started is within three seconds. The ink set is used for performing duplex printing by using a line type ink jet recording method with a line type recording head.

An ink constituting the ink set according to the embodiment, components contained in the ink, and components which may be contained will be described below. The ink set according to the embodiment contains at least one selected from a group of the black pigment ink, the self-dispersing color pigment ink, and the resin-dispersion color pigment ink which respectively have the above-described moisture quantities. As long as an ink set contains at least one of the inks, the ink set is assumed to constitute the ink set according to the embodiment.

1.1. Ink

Each of the inks constituting the ink set according to the embodiment (black pigment ink, self-dispersing color pigment ink, and resin-dispersion color pigment ink which respectively have the above-described moisture quantities) may contain a pigment as a colorant. The pigment may use any of an inorganic pigment and an organic pigment.

1.1.1. Black Pigment Ink

The black pigment ink constituting the ink set according to the embodiment contains a black pigment and water. The moisture quantity of the black pigment ink is from 68 mass % to 75 mass %.

As the pigment used in the black pigment ink, carbon black (C.I. Pigment Black 7) is preferable. Examples of the carbon black include furnace black, lamp black, acetylene black, and channel black.

Examples of commercial products of carbon black include carbon black No. 2300, No. 900, MCF88, No. 33, No. 40, No. 45, No. 52, MA7, MA8, MA100, No. 2200B, and the like (all the above are merchandise names of products manufactured by Mitsubishi Chemical Corporation); Raven H20, 5750, 5250, 5000, 3500, 1255, 700, and the like (all the above are merchandise names of products manufactured by Carbon Columbia Corporation); Regal 400R, 330R, 660R, Mogul L, Monarch 700, 800, 880, 900, 1000, 1100, 1300, 1400, and the like (all the above are merchandise names of products manufactured by Cabot Japan K.K.); Color Black FW1, FW2, FW2V, FW18, FW200, 5150, 5160, 5170, Printex 35, U, V, 140U, Special Black 6, 5, 4A, 4, and the like (all the above are merchandise names of products manufactured by Degussa Corporation); and BONJET BLACK M-800 (merchandise name of a product manufactured by Orient Chemical Industries Co., Ltd.).

The carbon black may be singly used or be used in combination of two or more types.

In order to obtain excellent concealing property and color reproducibility, the content of the carbon black is preferably from 1 mass % to 15 mass % with respect to the total mass (100 mass %) of the ink.

The average particle diameter of the carbon black is preferably from 50 nm to 500 nm. If the average particle diameter is equal to or more than 50 nm, a color-forming property is good. Thus, the carbon black is easily used as the ink. If the average particle diameter is equal to or less than 500 nm, the carbon black is easily used in an ink jet method. In order to obtain excellent storage stability, ejecting stability, and settleability of the ink, the average particle diameter is more preferably from 50 nm to 300 nm, and further preferably from 50 nm to 200 nm.

Here, the term of the "average particle diameter" in this specification refers to a sphere conversion 50% average particle diameter (d50) obtained by a light scattering method. The term of the "sphere conversion 50% average particle diameter (d50) by the light scattering method" corresponds to a value obtained in the following manner. Particles in a dispersion medium are irradiated with light and detectors which are respectively disposed in the front, the side and the rear of the dispersion medium measure diffractive scattering light which is generated by the irradiation. A particle which has originally an indeterminate form is assumed to be spherical by using the measured value. The particle is converted into a sphere having the same volume of the particle, and the total volume of a particle group is set to be 100% so as to obtain an accumulation curve. At this time, a point at which the accumulated value is 50% is set as the 50% average particle diameter (d50).

The black pigment ink has a moisture quantity which is from 68 mass % to 75 mass % with respect to the total mass (100 mass %) of the ink. In a case where the moisture quantity is in this range, it is possible to provide an ink set which can suppress the occurrence of transfer of the ink and deformation of a sheet, and can cause a speed of duplex printing to be increased. In a case where the moisture quantity is less than 68 mass %, the viscosity of the ink is too high, and thus infiltration to a sheet becomes slow and an amount of the ink transferred to the sheet transporting mechanism is increased. In the moisture quantity is more than 75 mass %, water causes a sheet to be largely deformed, cockling occurs or permanent curling is generated, and sheet transporting is difficult. In order to suppress the occurrence of deformation of a sheet due to water, the moisture quantity is more preferably from 70 mass % to 73 mass %.

As the water, pure water or ultra-pure water such as ion exchange water, ultrafiltration water, reverse osmotic water, and distilled water, that is, water in which ionic impurities are removed as much as possible is preferable. If water sterilized by ultraviolet ray radiation, addition of hydrogen peroxide, or the like is used, generation of mold or bacteria in a case where the ink is stored for a long term can be prevented. Thus, such water is desired.

As will be described below, the black pigment ink may be formed from a self-dispersing pigment which has a hydrophilic group on the surface of the pigment.

1.1.2. Self-Dispersing Color Pigment Ink

The self-dispersing color pigment ink constituting the ink set according to the embodiment contains water and a self-dispersing color pigment. In the self-dispersing color pigment, a hydrophilic functional group is chemically or physically provided on the surface of a pigment particle, in order to enable the pigment to be stably dispersed and maintained in water is used. The moisture quantity of the self-dispersing color pigment ink is from 62 mass % to 72 mass %.

Here, the self-dispersing pigment refers to a pigment which can be dispersed or dissolved in an aqueous medium without a dispersant. Here, the term of "dispersing or dissolving in an aqueous medium without a dispersant" means a state of stably being present in the aqueous medium by the hydrophilic group on the surface of the pigment, even when the dispersant for dispersing the pigment is not used. Thus, an ink in which foaming hardly occurs due to the dispersant, and the ejecting stability is excellent is easily produced. Since a significant increase of the viscosity due to the dispersant is suppressed, the pigment is easily handled, for example, the pigment may be contained more or the printing density may be sufficiently increased.

The hydrophilic group is preferably one or more hydrophilic groups selected from a group of —OM, —COOM, —CO—, —$SO_3M$, —$SO_2M$, —$SO_2NH_2$, —$RSO_2M$, —$PO_3HM$, $PO_3M_2$, —$SO_2NHCOR$, —$NH_3$, and —$NR_3$ (in the above formulas, M indicates a hydrogen atom, alkali metal, ammonium, a phenyl group which may have a substituent, or organic ammonium, and R indicates an alkyl group having 1 to 12 carbon atoms or a naphthyl group which may have a substituent).

The self-dispersing pigment is manufactured, for example, in such a manner that the following color pigment is subjected to a physical treatment or a chemical treatment so as to bond (graft) the hydrophilic group to the surface of the pigment. As the physical treatment, for example, a vacuum plasma treatment may be exemplified. As the chemical treatment, for example, a wet oxidation method of performing oxidization with an oxidant in water, a method in which a carboxyl group is bonded through a phenyl group by bonding p-aminobenzoic acid to the surface of the pigment, or the like may be exemplified.

A color pigment used in the self-dispersing color pigment ink may be appropriately exemplified in accordance with the type (color) of an ink to be obtained.

Examples of a pigment for a yellow ink include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185. Among the pigments, one or more types selected from a group of C.I. Pigment Yellow 74, 110, 128, and 129 are preferably used.

Examples of a pigment for a magenta ink include C.I. Pigment Red 5, 7, 12, 48(Ca), 48(Mn), 57(Ca), 57:1, 112, 122, 123, 168, 184, 202, and 209, and C.I. Pigment Violet 19. Among the pigments, one or more types selected from a group of C.I. Pigment Red 122, 202, and 209, and C.I. Pigment Violet 19 are preferably used. In addition, a solid solution of the above substances may be used.

Examples of a pigment for a cyan ink include C.I. Pigment Blue 1, 2, 3, 15:2, 15:3, 15:4, 15:34, 16, 22, and 60, C.I. Vat Blue 4 and 60. Among the pigments, at least one of C.I. Pigment Blue 15:3 and C.I. Pigment Blue 15:4 is preferably used, and C.I. Pigment Blue 15:3 is more preferably used.

The color pigment may be singly used or be used in combination of two or more types.

The content of the color pigment is not particularly limited as long as the content may be adjusted to be an appropriate content (pigment concentration) when the ink is prepared. For example, a light ink in which a pigment concentration is from 1 mass % to 3 mass % is used, and thus an image in which granularity is suppressed may be obtained. A normal ink in which the pigment concentration is from 4 mass % to 12 mass % is used, and thus an image having an excellent color-forming property may be obtained.

The average particle diameter of the color pigment is preferably from 50 nm to 500 nm. If the average particle diameter is equal to or more than 50 nm, the color-forming property becomes better, and thus the color pigment is easily used as an ink. If the average particle diameter is equal to or less than 500 nm, the color pigment is easily used in the ink jet method. In order to obtain excellent storage stability, ejecting stability, and settleability of the ink, the average particle diameter is more preferably from 50 nm to 300 nm, and further preferably from 50 nm to 200 nm.

The self-dispersing color pigment ink has a moisture quantity which is from 62 mass % to 72 mass % with respect to the total mass (100 mass %) of the ink. In a case where the moisture quantity is in this range, it is possible to provide an ink set which can suppress the occurrence of transfer of the ink and deformation of a sheet, and can cause a speed of duplex printing to be increased. In a case where the moisture quantity is less than 62 mass %, the viscosity of the ink is too high, and thus infiltration to a sheet becomes slow and an amount of the ink transferred to the sheet transporting mechanism is increased. In the moisture quantity is more than 72 mass %, water causes a sheet to be largely deformed, cockling occurs or permanent curling is generated, and sheet transporting is difficult. In order to suppress the occurrence of transfer of an ink to a double-side roller and the occurrence of deformation of a sheet due to water, the moisture quantity is more preferably from 66 mass % to 70 mass %.

Similarly to the black pigment ink, as the water, pure water or ultra-pure water such as ion exchange water, ultrafiltration water, reverse osmotic water, and distilled water, that is, water in which ionic impurities are removed as much as possible is preferable. If water sterilized by ultraviolet ray radiation, addition of hydrogen peroxide, or the like is used, generation of mold or bacteria in a case where the ink is stored for a long term can be prevented. Thus, such water is desired.

1.1.3. Resin-Dispersion Color Pigment Ink

The resin-dispersion color pigment ink constituting the ink set according to the embodiment contains water and a resin-dispersion pigment. The resin-dispersion pigment may be dispersed by resin dispersion in order to enable the pigment to be stably dispersed in the water. The moisture quantity of the resin-dispersion pigment ink is from 68 mass % to 75 mass %.

A case where a hydrophilic group is attached to the surface of a yellow pigment so as to be used as a self-dispersing yellow pigment ink may be technically difficult. Thus, as the yellow ink, a resin-dispersion yellow pigment ink is preferably used. As a pigment included in the resin-dispersion yellow pigment ink, an azo-based pigment, a condensed ring-based pigment, and the like may be exemplified in addition to a pigment such as Pigment Yellow disclosed in the Color Index. An organic pigment such as Yellow No. 4, No. 5, No. 205, and No. 401 is exemplified. A specific example of the yellow pigment includes C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, and 198. Among the pigments, it is preferable that an organic pigment included in the yellow ink contains at least one selected from a group of C.I. Pigment Yellow 74, 109, 110, 128, 138, 147, 150, 155, 180, and 188.

The pigment may be singly used or be used in combination of two or more types.

The pigment is preferably contained so as to be equal to or more than 6 mass %. In a case where the pigment concentration is equal to or more than 6 mass %, a record is excellent in color-forming property.

The average particle diameter of the pigment is preferably from 50 nm to 500 nm. If the average particle diameter is equal to or more than 50 nm, the color-forming property becomes better, and thus the color pigment is easily used as an ink. If the average particle diameter is equal to or less than 500 nm, the color pigment is easily used in the ink jet method. In order to obtain excellent storage stability, ejecting stability, and settleability of the ink, the average particle diameter is more preferably from 50 nm to 300 nm, and further preferably from 50 nm to 200 nm.

A resin (polymer) used in the resin-dispersion pigment is not limited to the following descriptions. However, for example, Tg of dispersion polymer used in dispersion of the pigment is preferably equal to or lower than 55° C., and more preferably equal to or lower than 50° C. If Tg is equal to or lower than 55° C., fixability can be improved. Polymer having a weight average molecular weight (in terms of styrene), which is obtained by gel permeation chromatography (GPC) and is from 10,000 to 200,000, is preferably used. Thus, the storage stability as the pigment ink is further improved.

Here, the weight average molecular weight in this specification is measured as a weight average molecular weight in terms of stylene, by using the gel permeation chromatography (GPC) of L7100 system (manufactured by Hitachi Ltd.).

If a polymer in which a component of 70 mass % or more is a copolymer of (meta)acrylate and (meta)acrylic acid is used as the above polymer, fixability and glossiness is further improved. A polymer obtained by polymerizing a monomer component in which at least one of alkyl (meta)acrylate having carbon atoms of 1 to 24 and cyclic alkyl (meta)acrylate having carbon atoms of 3 to 24 is equal to or more than 70 mass % is preferable. A specific example of such a polymer includes methyl (meta)acrylate, ethyl (meta)acrylate, propyl (metal)acrylate, n-butyl (meta)acrylate, isobutyl (meta)acrylate, pentyl (meta)acrylate, hexyl (meta)acrylate, 2-ethylhexyl (meta)acrylate, octyl (meta)acrylate, nonyl (meta)acrylate, decyl (meta)acrylate, t-butyl cyclohexyl (meta)acrylate, lauryl (meta)acrylate, isobornyl (meta)acrylate, cetyl (meta)acrylate, stearyl (meta)acrylate, isostearyl (meta) acrylate, tetramethylpiperidyl (meta) acrylate, dicyclopentanyl (meta) acrylate, dicyclopentenyl (meta)acrylate, dicyclopentenyloxy (meta) acrylate, and behenyl (meta)acrylate. As other additive components, hydroxy (meta)acrylate which has a hydroxyl group, urethane (meta)acrylate, and epoxy (meta)acrylate may be also used. Examples of the hydroxy (meta)acrylate include hydroxyethyl (meta)acrylate, hydroxypropyl (meta)acrylate, and diethylene glycol (meta) acrylate.

For further improving fixability, glossiness, and color producibility, among the resin-dispersion pigments, a pigment (microcapsule type pigment) coated with polymer is appropriately used.

The pigment coated with polymer is obtained by using a phase reversal emulsification method or a sedimentation deposition method. In the phase reversal emulsification method, firstly, the polymer is dissolved in an organic solvent such as methanol, ethanol, isopropanol, n-butanol, acetone, methyl ethyl ketone, and dibutyl ether. The pigment is added to the obtained solution and then a neutralizing agent and water are added. A kneading and dispersing treatment is performed and thus an oil-in-water type dispersion matter is prepared. The organic solvent is removed from the obtained dispersion matter, and thus the pigment coated with polymer may be obtained as a water dispersion matter. The kneading and dispersing treatment may be performed, for example, by using a ball mill, a roll mill, a bead mill, a high-pressure homogenizer, a high-speed stirring type disperser, and the like.

As the neutralizing agent, trivalent amine such as ethylamine and trimethylamine, lithium hydroxide, sodium hydroxide, potassium hydroxide, ammonia, and the like are preferably used. pH of the obtained water dispersion matter is preferably from 6 to 10.

As the polymer for coating the pigment, a substance in which the weight average molecular weight measured by the GPC is about from 10,000 to 150,000 is preferably used because the substance causes the pigment to be stably dispersed.

The content ratio of the pigment dispersion resin may be appropriately selected depending on a pigment to be dispersed. However, the content ratio of the pigment dispersion resin is preferably from 5 parts by mass to 200 parts by mass, and more preferably from 30 parts by mass to 120 parts by mass, with respect to 100 parts by mass as the content of the pigment in an ink.

The resin-dispersion color pigment ink has a moisture quantity which is from 68 mass % to 75 mass % with respect to the total mass (100 mass %) of the ink. In a case where the moisture quantity is in this range, it is possible to provide an ink set which can suppress the occurrence of transfer of the ink and deformation of a sheet, and can cause a speed of duplex printing to be increased. In a case where the moisture quantity is less than 68 mass %, the viscosity of the ink is too high, and thus infiltration to a sheet becomes slow and an amount of the ink transferred to the sheet transporting mechanism is increased. In the moisture quantity is more than 75 mass %, water causes a sheet to be largely deformed, cockling occurs or permanent curling is generated, and sheet transporting is difficult. In order to suppress the occurrence of deformation of a sheet, the moisture quantity is more preferably from 70 mass % to 73 mass %.

As the water, pure water or ultra-pure water such as ion exchange water, ultrafiltration water, reverse osmotic water, and distilled water, that is, water in which ionic impurities are removed as much as possible is preferable. If water sterilized by ultraviolet ray radiation, addition of hydrogen peroxide, or the like is used, generation of mold or bacteria in a case where the ink is stored for a long term can be prevented. Thus, such water is desired.

1.2. Acetylene Glycol-Based Surfactant

Each of the inks constituting the ink set according to the embodiment may contain three or more types of acetylene glycol-based surfactants selected from a group of acetylene glycols and ethylene oxide adducts of acetylene glycol. In this case, the total content of the acetylene glycol-based surfactants is from 0.1 mass % to 3 mass % with respect to the total mass of each of the inks constituting the ink set.

In a case where each of the inks constituting the ink set according to the embodiment contains three or more types of acetylene glycol-based surfactants which have the above-described specific structure, so as to cause the content of the acetylene glycol-based surfactants to be from 0.1 mass % to 3 mass % with respect to the total mass of each of the inks, the ink is infiltrated to a sheet rapidly. Thus, an effect of suppressing the occurrence of transfer of the ink to the sheet transporting mechanism is obtained.

In the following descriptions, in this specification, a case of being referred to as "three or more types of acetylene glycol-based surfactants" indicates three or more types acetylene glycol-based surfactants which are selected from a group formed by the following formula (1) and the following formula (2).

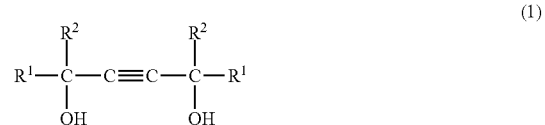

(1)

In the formula (1), each of $R^1$ and $R^2$ independently indicates an alkyl group having carbon atoms of 1 to 5. The alkyl group having carbon atoms of 1 to 5 may have a straight-chain structure or have a branched-chain structure. A specific example of such an alkyl group includes a methyl group, an ethyl group, an n-propyl group, an isopropyl group, an n-butyl group, an isobutyl group, a sec-butyl group, a tert-butyl group, a pentyl group, an isopentyl group, a neopentyl group, and the like. $R^1$ and $R^2$ may be the same as each other or be different from each other.

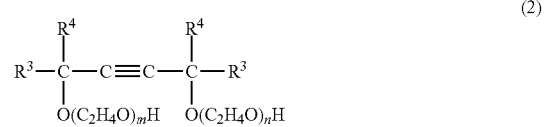

(2)

In the formula (2), each of $R^3$ and $R^4$ independently indicates an alkyl group having carbon atoms of 1 to 5. Each of m and n indicates a positive number of 0.5 to 25, and (m+n) is from 1 to 40. The alkyl group having carbon atoms of 1 to 5 may have a straight-chain structure or have a branched-chain structure. A specific example of such an alkyl group includes a methyl group, an ethyl group, an n-propyl group, an isopropyl group, an n-butyl group, an isobutyl group, a sec-butyl group, a tert-butyl group, a pentyl group, an isopentyl group, a neopentyl group, and the like. $R^3$ and $R^4$ may be the same as each other or be different from each other. Each of m and n indicates the number of moles of added ethylene oxide. (m+n) is required to be from 1 to 40. However, (m+n) is preferably from 10 to 30, and more preferably from 15 to 25.

It is considered that the reason of a mechanism in which an ink which contains three or more types of acetylene glycol-based surfactants having the above-described specific structure is used, and thus an effect of rapidly infiltrating the ink to a sheet can be exhibited is as follows.

If a plurality of surfactants which have a structure similar to each other is provided in the ink, arrangement of each of the surfactants is disturbed, forming a large micelle formed from one surfactant is difficult, and each of the surfactants is present in a form of a minute cluster. As a result, a moving speed of the ink on a surface of a recording medium is increased, and wettability and an infiltration property to the recording medium are improved. Thus, it is possible to realize improvement of image quality and speeding-up in recording. Such a phenomenon occurs further significantly by causing the three or more types of acetylene glycol-based surfactants which have a structure similar to each other, to be provided.

It is known that an infiltration speed of the ink to a recording medium is proportional to a value calculated from an expression represented by γ·cos θ (here, γ indicates surface tension of the ink and θ indicates a contact angle of the ink with the recording medium). Here, a fluorine-based surfactant or a silicone-based surfactant which has been widely used in an ink for ink jet recording has a small contact angle θ, but also has small surface tension γ. Thus, improvement of the infiltration speed of the ink to the recording medium is not expected. On the contrary, the acetylene glycol-based surfactant has a small contact angle, but has high surface tension γ. Thus, it is possible to realize improvement of the infiltration speed of the ink, improvement of image quality and fixability, and speeding-up in recording. Such an action is further significantly exhibited by causing the three or more types of acetylene glycol-based surfactants which have a structure similar to each other, to be provided.

A status of image quality in this specification may be determined based on a state such as aggregation of ink droplets, color unevenness, bleeding, contamination of an image due to transfer of the ink to a roller, and the like. Here, the aggregation of ink droplets means a phenomenon occurring by that an ink droplet attached to the recording medium flows before the recording medium is spread wet, and thus the flowing ink droplet is combined to another ink droplet. If such aggregation of ink droplets occurs, streak unevenness, color unevenness, or the like may occur. The streak unevenness represents a state where a portion of which the surface of the recording medium is not coated with ink droplets remains so as to have a stripe shape. The color unevenness may occur in an image, by a local irregularity of density. The bleeding refers to a state where an outline of an image recorded with a single color is blurred and thus the image is not clear, or one adjacent color is blurred to another color side in a border between different colors and thus the colors are mixed to each other, and the image is not clear.

A specific example of acetylene glycol represented by the formula (1) includes 2,5,8,11-tetramethyl-6-dodecyne-5,8-diol, 5,8-dimethyl-6-dodecyne-5,8-diol, 2,4,7,9-tetramethyl-5-decyne-4,7-diol, 4,7-dimethyl-5-decyne-4,7-diol, 2,3,6,7-tetramethyl-4-octyne-3,6-diol, 3,6-dimethyl-4-octyne-3,6-diol, 3,6-diethyl-4-octyne-3,6-diol, and 2,5-dimethyl-3-hexyne-2,5-diol. As the acetylene glycol represented by the formula (1), commercial product may be used. For example, Surfynol 82, 104, and DF-110 (all the above are merchandise name, manufactured by Nissin Chemical Co., Ltd.) may be included.

A specific example of an ethylene oxide adduct of acetylene glycol represented by the formula (2) includes ethylene oxide adducts of compounds exemplified in the specific example of acetylene glycol represented by the formula (1). As the ethylene oxide adduct of the acetylene glycol represented by the formula (2), commercial product may be used. For example, Olfine E1004, E1010, and E4300, and Surfynol 485 (all the above are merchandise name, manufactured by Nissin Chemical Co., Ltd.) may be included.

It is preferable that the three or more types of acetylene glycol-based surfactants contain one or more types of acetylene glycol represented by the formula (1) and two or more types of ethylene oxide adducts of acetylene glycol represented by the formula (2). Thus, the effect by the above-described three or more types of acetylene glycol-based surfactants is further improved.

The total content of the three or more types of acetylene glycol-based surfactants is required to be from 0.1 mass % to 3 mass % with respect to the total mass of each of the inks. The total content of the surfactants is preferably from 0.5 mass % to 2 mass %, and more preferably from 1 mass % to 2 mass %. The above-described effect is exhibited so as to be further improved, by causing the content of the three or more types of acetylene glycol-based surfactants to be in the above range. If the content of the surfactants is less than 0.1 mass %, obtaining of the effect of rapidly infiltrating the ink to a sheet is difficult.

The content of each of the three or more types of acetylene glycol-based surfactants is preferably 5 mass % or more and 50 mass % or less, and preferably 10 mass % or more and less than 50 mass %, with respect to the total content of the three or more types of acetylene glycol-based surfactants. Mixing balance between the three or more types of acetylene glycol-based surfactants becomes good by causing the above content to be in the numerical range. Thus, the effect occurring by containing the three or more types of acetylene glycol-based surfactants is further improved.

In a case where among the three or more types of acetylene glycol-based surfactants, a HLB value of a first acetylene glycol-based surfactant is set as $h_1$, a HLB value of a second acetylene glycol-based surfactant is set as $h_2$, and a HLB value of a third acetylene glycol-based surfactant is set as $h_3$, all of the following expressions (A), (B), and (C) are preferably satisfied.

$$h_1 < h_2 < h_3 \quad \text{(A)}$$

$$h_1 < 6 \quad \text{(B)}$$

$$10 \leq h_3 \quad \text{(C)}$$

In this manner, an ink which contains three or more types of acetylene glycol-based surfactant having a HLB value different from each other is used, and thus the effect of rapidly infiltrating the ink to a sheet is improved. More specifically, the first acetylene glycol which is lipophilic is contained, and thus an effect of wet spreadability to a recording medium having low ink absorptivity is exhibited so as to be good. The third acetylene glycol which is hydrophilic is contained, and thus the effect of wet spreadability to a recording medium having high ink absorptivity is exhibited so as to be good. The second acetylene glycol-based surfactant having a HLB value which is intermediate between the HLB values of the first acetylene glycol-based surfactant and the second acetylene glycol-based surfactant is contained, and thus good compatibility between the first acetylene glycol-based surfactant and the third acetylene glycol-based surfactant is provided. Thus, a good discharging property in high-speed printing can be obtained. In this manner, the above-described effect occurring by containing the three or more types of acetylene glycol-based surfactants is obtained.

The three or more types of acetylene glycol-based surfactants contained in the ink according to the embodiment satisfy the above expressions (A) to (C). In addition, the HLB value ($h_2$) of the second acetylene glycol-based surfactant is preferably from 7 to 12 (that is, $7 \leq h_2 \leq 12$), and more preferably from 8 to 12 (that is, $8 \leq h_2 \leq 12$). Thus, the balance between the HLB values of the three or more types of acetylene glycol-based surfactants contained in the ink is good. Accordingly, image quality, fixability, and high-speed recording properties to various types of recording mediums may be further improved.

The HLB value ($h_1$) of the first acetylene glycol-based surfactant is preferably less than 6 as shown in the expression (B). However, from a viewpoint in that dispersibility of the first acetylene glycol-based surfactant in the ink is improved, the HLB value ($h_1$) is more preferably 1 or more and less than 6 (that is, $1 \leq h_1 < 6$), and further preferably 3 or more and less than 6 (that is, $3 \leq h_1 < 6$).

The HLB value ($h_3$) of the third acetylene glycol-based surfactant is preferably equal to or more than 10 as shown in the expression (C). However, from a viewpoint in that good miscibility of the third acetylene glycol-based surfactant and other surfactants can be ensured and infiltration property to a recording medium having high absorptivity of an ink can be further improved, the HLB value ($h_3$) is more preferably from 10 to 20 (that is, $10 \leq h_3 \leq 20$), and further preferably from 12 to 18 (that is, $12 \leq h_3 \leq 18$).

In the invention, the HLB value is a value for evaluating hydrophilicity of a compound, which is proposed by Davies and others. For example, the HLB value refers to a numerical value obtained by using Davies method which is defined in the document "J. T. Davies and E. K. Rideal, "Interface Phenomena" 2nd ed. Academic Press, New York 1963" and to a value calculated by the following expression (i).

$$HLB\ value = 7 + \Sigma[1] + \Sigma[2] \qquad (i)$$

(In the expression (i), [1] indicates a cardinal number of a hydrophilic group and [2] indicates a cardinal number of a hydrophobic group)

In a case where, with respect to the total mass (100 mass %) of the ink, the content of the first acetylene glycol-based surfactant is set as $W_1$ mass %, the content of the second acetylene glycol-based surfactant is set as $W_2$ mass %, and the content of the third acetylene glycol-based surfactant is set as $W_3$ mass %, a ratio ($W_1:W_2:W_3$) of the above contents is preferably in a range of 3:1:1 to 1:1:1. Since mixing balance between the three or more types of acetylene glycol-based surfactant becomes good by causing the ratio to be in the numerical range, the effect occurring by containing the three or more types of acetylene glycol-based surfactants is further improved.

It is preferable that the three or more types of acetylene glycol-based surfactants contain one or more types of acetylene glycol which is not transparently dissolved when being added to water so as to have a concentration of 1%, one or more types of ethylene oxide adducts of acetylene glycol which is not transparently dissolved when being added to water so as to have a concentration of 1%, and one or more types of ethylene oxide adducts of acetylene glycol which is transparently dissolved when being added to water so as to have a concentration of 1%. Thus, the effect by the above-described three or more types of acetylene glycol-based surfactants may be further improved.

The solubility of the acetylene glycol-based surfactant to water may be determined based on light transmittance of a liquid mixture of the acetylene glycol-based surfactant and water. A liquid mixture having light transmittance which is equal to or more than 90% is set to "be transparently dissolved". A liquid mixture having light transmittance which is less than 90% is set to "be not transparently dissolved". The acetylene glycol-based surfactant is added to water so as to have a concentration of 1%, and mixing and stirring is performed for 10 minutes or longer, thereby the liquid mixture is prepared. The light transmittance may be measured by using a spectrophotometer and by using a quartz cell having an optical path length of 1 cm. An example of the spectrophotometer used in the measurement includes U-3900 (merchandise name) manufactured by Hitachi High-Technologies Corporation.

1.3. Alkylene Glycol Monoalkyl Ether

The ink constituting the ink set according to the embodiment may contain alkylene glycol monoalkyl ether. In a case where the ink constituting the ink set according to the embodiment contains alkylene glycol monoalkyl ether, alkylene glycol monoalkyl ether functions as an infiltrating agent, and thus an ink is infiltrated to a sheet rapidly, and the effect of suppressing the occurrence of transfer of an ink to the sheet transporting mechanism is obtained.

Examples of alkylene glycol monoalkyl ether include ethylene glycol monoisobutyl ether, ethylene glycol monohexyl ether, ethylene glycol monoisohexyl ether, diethylene glycol monohexyl ether, triethylene glycol monobutyl ether (TEGmBE), diethylene glycol monoisohexyl ether, triethylene glycol monoisohexyl ether, ethylene glycol mono isoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethyl pentyl ether, ethylene glycol mono-2-ethyl pentyl ether, ethylene glycol mono-2-ethylhexyl ether, diethylene glycol mono-2-ethylhexyl ether, ethylene glycol mono-2-methyl pentyl ether, diethylene glycol mono-2-methyl pentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether.

The alkylene glycol monoalkyl ethers may be singly used or two or more thereof may be mixed and used.

In a case where the alkylene glycol monoalkyl ether is contained, the content may be set to be from 0.5 mass % to 6 mass % with respect to the total mass of the ink.

1.4. 1,2-Alkane Diol

The ink constituting the ink set according to the embodiment may contain 1,2-alkane diol. In a case where the ink constituting the ink set according to the embodiment contains 1,2-alkane diol, 1,2-alkane diol functions as an infiltrating agent, and thus an ink is infiltrated to a sheet rapidly, and the effect of suppressing the occurrence of transfer of an ink to the sheet transporting mechanism is obtained.

Examples of 1,2-alkane diols include 1,2-propanediol, 1,2-butanediol, 1,2-pentanediol, 1,2-hexanediol, and 1,2-octanediol.

1,2-alkane diols may be singly used or two or more thereof may be mixed and used.

In a case where the 1,2-alkane diols is contained, the content may be set to be from 1 mass % to 20 mass % with respect to the total mass of the ink.

1.5. Trimethylglycine

The ink constituting the ink set according to the embodiment may contain trimethylglycine (also referred to as glycinebetaine). Trimethylglycine is one of betaine compounds which function as a moisturizing agent. Trimethylglycine is a substance which is excellent in curling and cockling aptitudes, and is excellent in viscosity characteristics depending on the temperature. Thus, in a case where the ink constituting the ink set according to the embodiment contains trimethylglycine, it is possible to suppress the occurrence of permanent curling on a sheet, improve the sheet transporting properties, and to allow speeding-up of the duplex printing.

In a case where the trimethylglycine is contained, the content thereof may be set to be from 1 mass % to 40 mass %, and to be preferably from 5 mass % to 30 mass %, with respect to the total mass of the ink. As a commercial product of trimethylglycine, for example, AMINOCOAT (manufactured by Asahi Kasei Chemical Corporation) may be used.

1.6. Other Components

The ink constituting the ink set according to the embodiment may contain other organic solvents, other resins, a surfactant (also referred to as "other surfactant" below) other than the acetylene glycol-based surfactant having the above-described specific structure, a pH adjuster, a corrosion inhibitor or antifungal agent, a rust inhibitor, a chelating agent, and the like.

1.6.1. Organic Solvent

The organic solvent is not particularly limited. Examples of the organic solvent include polyhydric alcohols and pyrrolidone derivatives.

Examples of polyhydric alcohols include ethylene glycol, diethylene glycol, propylene glycol, dipropylene glycol, 1,3-propanediol, 1,4-butanediol, 1,6-hexanediol, trimethylol propane, and glycerine. Polyhydric alcohols include a function of improving wettability of an ink to a sheet, a function of improving a moisture-retaining property for a nozzle of a recording head, or the like. In a case where the polyhydric alcohols are contained, the content may be set to be from 2 mass % to 30 mass %, with respect to the total mass of the ink.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. The pyrrolidone derivatives may function as a good solubilizer for a resin. In a case where the pyrrolidone derivatives are contained, the content may be set to be from 0.5 mass % to 6 mass %, with respect to the total mass of the ink.

1.6.2. Resin

The resin includes a function of improving fixability of the ink. Examples of the resin include acrylic-based resins, fluorene-based resins, urethane-based resins, olefin-based resins, rosin-modified resins, terpene-based resins, ester-based resins, amide-based resins, epoxy-based resins, vinyl chloride-based resins, vinyl chloride-vinyl acetate copolymer, and ethylene-vinyl acetate-based resins. The above-described resins may be singly used or be used in combination of two or more types. As the resin, an emulsion type resin may be used or a solution type resin may be used. In a case where the resin is contained, the content thereof may be set to be from 0.1 mass % to 6 mass %.

1.6.3. Other Surfactants

The ink constituting the ink set according to the embodiment may contain other surfactant (surfactants other than the acetylene glycol-based surfactant having the above-described specific structure). Examples of such surfactants may include acetylene glycol-based surfactants which do not correspond to the above formulas (1) and (2), silicone-based surfactants, and fluorine-based surfactants.

1.6.4. pH Adjuster, Corrosion Inhibitor or Antifungal Agent, Rust Inhibitor, and Chelating Agent Examples of the pH adjuster include Good's buffers, phosphate buffer solutions, and TRIS buffer solutions such as potassium dihydrogen phosphate, disodium hydrogen phosphate, sodium hydroxide, lithium hydroxide, potassium hydroxide, ammonia, diethanolamine, triethanolamine, tri-isopropanolamine, potassium carbonate, sodium carbonate, sodium hydrogen carbonate, tris(hydroxymethyl)amino methane (THAM), 4-(2-hydroxyethyl)-1-piperazine ethane sulfonic acid (HEPES), morpholino ethanesulfonic acid (MES), carbamoylmethyl imino bis acetic acid (ADA), piperazine-1,4-bis(2-ethane sulfonic acid) (PIPES), N-(2-acetamide)-2-amino ethanesulfonic acid (ACES), colamine hydrochloride, N, N-bis(2-hydroxyethyl)-2-aminoethane sulfonic acid (BES), N-tris (hydroxymethyl)methyl-2-amino ethanesulfonic acid (TES), acetamide glycine, tricine, glycine amide, and bicine.

Examples of the corrosion inhibitor and the antifungal agent include sodium benzoate, pentachlorophenol sodium, 2-pyridinethiol-1-oxide sodium, sodium sorbate, sodium dehydroacetate, 1,2-dibenzo isothiazolin-3-on (PROXEL CRL, PROXEL BDN, PROXEL GXL, PROXEL XL.2, PROXEL TN, and PROXEL LV of Zeneca Corporation), and 4-chloro-3-methylphenol (PREVENTOL CMK of Bayer Holding Ltd.).

An example of the rust inhibitor includes benzotriazole.

Examples of the chelating agent include ethylenediamine tetraacetic acids and salts thereof (ethylenediamine tetraacetic acid disodium dihydrogen salt and the like).

1.7. Preparing Method of Ink

The ink constituting the ink set according to the embodiment is obtained in such a manner that the above-described components are mixed to each other in certain order, and if necessary, impurities are removed by filtering and the like. As a mixing method of the components, a method in which materials are sequentially put into a container which includes a stirring device such as a mechanical stirrer and a magnetic stirrer, and stirring and mixing is performed is appropriately used. As a filtering method, centrifugal filtration, filter filtration, and the like may be performed as necessary.

1.8. Physical Properties

Regarding the ink constituting the ink set according to the embodiment, from a viewpoint of balance between image quality and reliability as an ink for ink jet recording, surface tension at 20° C. is preferably from 20 mN/m to 40 mN/m, and more preferably from 25 mN/m to 35 mN/m. The surface tension may be measured by using, for example, an automatic surface tension measuring device CBVP-Z (merchandise name, manufactured by Kyowa Interface Science Co., Ltd.), and may be measured by confirming surface tension when a platinum plate is wet with the ink under an environment of 20° C.

In order to allow high-speed infiltration with low viscosity, viscosity of the ink at 20° C. is preferably from 2.0 $mm^2/s$ to 4.0 $mm^2/s$, and more preferably from 2.8 $mm^2/s$ to 3.2 $mm^2/s$. The viscosity may be measured under an environment of 20° C. by using, for example, a viscoelasticity tester MCR-300 (merchandise name, manufactured by Pysica Corporation).

As described above, according to the embodiment, the moisture quantity of the ink constituting an ink set is adjusted, and thus it is possible to provide an ink set which can suppress the occurrence of transfer of the ink and deformation of a sheet, and can cause a speed of duplex printing to be increased.

2. Duplex Printing Method

A duplex printing method according to an embodiment of the invention is performed as follows. The above-described ink set is mounted in an ink jet recording apparatus which includes sheet transporting mechanism (which will be described later) in which a period from when printing on a front surface is started, until printing on a back surface is started is within three seconds. Ink droplets of an ink constituting the ink set are ejected so as to adhere the ink droplets to a recording medium. Thus, both surfaces of a sheet which corresponds to the recording medium are printed. In the duplex printing method according to the embodiment, above-described ink set is used. Thus, it is possible to suppress the occurrence of transfer of the ink to the sheet transporting mechanism, to improve the sheet transporting properties, and to allow speeding-up of the duplex printing.

2.1. Configuration of Apparatus

As the ink jet recording apparatus used in the duplex printing method according to the embodiment, for example, a well-known ink jet printer and the like is used. As such an ink jet printer, any of a serial type ink jet recording apparatus in which a serial head is employed as a recording head, and a line type ink jet recording apparatus in which a line head is employed as a recording head may be used. Here, detailed descriptions will be made by using the line type ink jet recording apparatus which employs a line head, as an example.

FIGURE illustrates a side sectional structure of an ink jet recording apparatus used in the embodiment. The ink jet recording apparatus includes a main body frame 10 which has a quadrangular box. In the following descriptions, in the same drawing, the right side is set as the front side of the ink jet recording apparatus, and the left side is set as the rear side of the ink jet recording apparatus.

An operation panel 11 which functions as a user interface is provided on a front side surface of the main body frame 10. An operation switch or a liquid crystal panel is provided in the operation panel 11. An extendable ejection tray 25 in which a sheet P to be printed is mounted is provided at the front portion of the main body frame 10. An openable manual feeding port cover 12 is provided on the rear upper side of the main body frame 10. A manual feeding port 22 for manually inserting the sheet P is opened by closing the manual feeding port cover 12.

A sheet tray 13 is provided at a lower portion of the main body frame 10, so as to be attachable. In the sheet tray 13, plural pieces of sheets P may be accommodated in a state of being stacked. In the main body frame 10, a feeding mechanism 34 for feeding the sheet P in the sheet tray 13 is provided over the sheet tray 13. The feeding mechanism 34 includes a rocking arm 14 and a pickup roller 15. The rocking arm 14 is journaled to the main body frame 10 so as to be swingable. The pickup roller 15 is provided at a tip end portion of the rocking arm 14. The pickup roller 15 delivers the top sheet of the stack of the sheets P accommodated in the sheet tray 13 rearwardly in accordance with the rotation of the pickup roller 15. The wall surface on the rear of the sheet tray 13 functions as a separation inclined-surface 16 which is inclined rearwardly with being upward.

In the ink jet recording apparatus, a transporting path C1 of a sheet P fed by the sheet tray 13 is formed so as to be turned over forward and be directed to the ejection tray 25 after being directed to the separation inclined-surface 16 from the stack of the sheets P in the sheet tray 13, and being directed upwardly by the separation inclined-surface 16. A transporting path C2 of a sheet P fed by the manual feeding port 22 is joined at a portion of the transporting path C1 just after the sheet P is turned over, from the manual feeding port 22, and is common with the transporting path C1. In the following descriptions, feeding sides in the transporting paths C1 and C2 are referred to an upstream of the transporting paths C1 and C2, and ejecting sides are referred to a downstream of the transporting paths C1 and C2.

In the transporting path C1, an intermediate roller 17 is provided as an example of a second transporting roller, on a downstream of the separation inclined-surface 16. A separation roller 18 is provided on the intermediate roller 17 so as to be adjacent to the intermediate roller 17. The separation roller 18 is rotated by the rotation of the intermediate roller 17. An outer circumferential surface of the separation roller 18 is formed by an elastic material and is pressed on the intermediate roller 17 with a defined force. Thus, appropriate rotation resistance is applied to a sheet P which passes between the intermediate roller 17 and the separation roller 18, and thus feeding of overlapped sheets P is prevented.

An intermediate assist roller 19 is provided on a downstream of the separation roller 18 in the transporting path C1. The intermediate assist roller 19 is provided in a state of being pressed on the intermediate roller 17, and is rotated by the rotation of the intermediate roller 17.

In the transporting paths C1 and C2, a sheet feeding roller 20 is provided as an example of a first transporting roller, on a downstream of the intermediate assist roller 19. A sheet delivery assist roller 21 is pressed on the sheet feeding roller 20. The sheet delivery assist roller 21 is rotated by the rotation of the sheet feeding roller 20. A sheet detecting sensor is provided in the vicinity of the sheet feeding roller 20 on the upstream side of the transporting paths C1 and C2. The sheet detecting sensor detects whether or not a sheet P is provided at the position of the sheet detecting sensor. As the sheet detecting sensor 40, for example, an optical sensor is used.

An ejecting roller 23 is provided on a downstream of the sheet feeding roller 20 in the transporting paths C1 and C2. An ejecting assist roller 24 is pressed on the ejecting roller 23. The ejecting assist roller 24 is rotated by the rotation of the ejecting roller 23.

A head unit 27 is provided in the main body frame 10. The head unit 27 is supported by a support section 26. An ink jet type recording head 28 is provided at a lower portion of the head unit 27. The recording head 28 is a line type ink jet head including a long nozzle row which is provided over the entirety of the width of the sheet P in a width direction thereof. In a case where color printing is performed, a nozzle row of each color for discharging ink droplets of the corresponding color is formed on a nozzle surface of the line type ink jet head. In addition, a configuration in which a line type ink jet head of each color which includes a nozzle row of the corresponding color for discharging ink droplets of the corresponding color is included may be made. Here, the line type ink jet head is used with the meaning of including all of the above-described cases. When printing is performed, the recording head 28 is set to be positioned over a section between the sheet feeding roller 20 and the ejecting roller 23 in the transporting paths C1 and C2.

A support base 29 which supports a sheet P is provided at a position in the main body frame 10, which faces the recording head 28. The head unit 27 is provided in a vertical direction in the drawing, so as to enable going up and down. A gap between the recording head 28 and the support base 29 may be adjusted in accordance with the ascent and the descent (described as gap adjustment below).

The ink jet recording apparatus includes a motor (not illustrated) as a driving source. In the ink jet recording apparatus, the motor rotates the sheet feeding roller 20 and the ejecting roller 23. Rotation directions of the sheet feeding roller 20 and the ejecting roller 23 are switched in accordance with a rotation direction of the motor. A configuration in which the power of the motor 31 is also transferred to the intermediate roller 17 and the rotation direction of the intermediate roller 17 is maintained so as to be constant is made.

A controller (not illustrated) which performs various types of control for the ink jet recording apparatus is provided. The controller is connected to the operation panel 11. The controller confirms an operation status of an operation switch provided in the operation panel 11, and controls a display of a liquid crystal panel which is provided in the same operation panel 11.

In the embodiment, the intermediate roller 17, the separation roller 18, the intermediate assist roller 19, the sheet feeding roller 20, the sheet delivery assist roller 21, the ejecting roller 23, the ejecting assist roller 24, and the like constitute the sheet transporting mechanism. In the embodiment, the sheet transporting mechanism is set to cause a period from when printing on the front surface of a sheet P is started until printing on the back surface is started to be within three seconds. That is, in a case where plain paper is used as a sheet P, a duplex printing speed (pages/minute) in printing a solid image on the entirety of a surface of the sheet P is set to be from 30% of a simplex printing speed, to 100% thereof.

2.2. Duplex Printing

Details of the duplex printing method according to the embodiment will be described. The controller determines printing conditions in accordance with the operation status of the operation switch provided in the operation panel 11. For example, it is determined whether manual feeding is performed or tray feeding is performed, based on information of a feeding type, which is included in printing condition information. The size of a gap between the recording head and the support base 29 during printing is determined based on information of the type of a sheet, printing quality, and the like, which is included in the printing condition information.

The controller confirms the state of the recording head 28 and performs gap adjustment. Here, in a case where tray feeding is performed, after the controller completes the gap adjustment, the controller controls the motor to be normally rotated, and controls the pickup roller 15 to be rotated. Thus, a sheet P is delivered from the stack in the sheet tray 13. The delivered sheet P is transported on the transporting path C1 by the intermediate roller 17 and the sheet feeding roller 20, until the leading end of the sheet P reaches a printing start position.

In a case where manual feeding is performed, after the controller completes the gap adjustment, the controller waits until a user operates a feeding start button provided in the operation panel 11. If the feeding start button is operated, the controller controls the motor to be normally rotated. Thus, a sheet P is transported by the intermediate roller 17 and the sheet feeding roller 20, until the leading end of the sheet P reaches a printing start position. If the leading end of the sheet P reaches a printing start position, the controller starts printing on the front surface.

After printing on the front surface of the sheet P is completed, the controller performs a reversing operation of a print surface of the sheet P. The reversing operation is performed by causing the motor to be reversely rotated. If the motor is reversely rotated, the sheet feeding roller 20 is reversely rotated, and thus the sheet P having the front surface printed thereon is transported to the rear side of the printing apparatus. The delivered sheet P is firstly inserted into a lower side of the intermediate roller 17. The sheet P turns around the intermediate roller 17 by the intermediate roller 17 which is normally rotated. Then, the sheet P is caused to return to the sheet feeding roller 20 side from a upper portion side of the same intermediate roller 17. Thus, the print surface of the sheet P is reversed from the front surface to the back surface. After the entirety of the sheet P passes through the sheet feeding roller 20, the controller reverses the rotation direction of the motor. The controller starts printing on the back surface in a state where the sheet P is transported until the leading end thereof reaches the printing start position. If printing on the back surface is completed, the controller ejects the sheet P on which printing is completed, to the ejection tray 25, and ends a printing operation.

As described above, according to the embodiment, the moisture quantity of the ink constituting an ink set is adjusted, and thus the occurrence of deformation of a sheet is suppressed. Since the ink is infiltrated to a sheet and dried during a period from when printing on the front surface is started until printing on the back surface is started, the occurrence of transfer of the ink is suppressed. Accordingly, it is possible to increase the speed of duplex printing.

3. Example

The invention will be specifically described below by using experimental examples and comparative examples. However, the invention is not limited to only the examples.

3.1. Preparation of Ink

An ink was prepared in the manner disclosed in JP-A-2011-178916, by using materials shown in Table 1. As shown in Table 2, in the example, the moisture quantity of each ink was adjusted so as to be from 57 mass % to 84 mass %. In the example, four inks (self-dispersing black ink, self-dispersing cyan ink, self-dispersing magenta ink, and resin-dispersion yellow ink) were manufactured only by changing the type of a pigment, and each of the four inks was independently evaluated.

TABLE 1

| Composition of ink | | Added amount [mass %] |
|---|---|---|
| Pigment | | 6 |
| Infiltrating Agent | TEGmBE | 2 |
| Infiltrating Agent | 1,2-hexanediol | 2 |
| Moisturizing Agent | Glycerine | Adjustment |
| Moisturizing Agent | Trimethylglycine | 5 |
| Surfactant 1 | Surfynol 104 | 0.4 |
| Surfactant 2 | Olfine E1004 | 0.4 |
| Surfactant 3 | Olfine E1010 | 0.4 |
| Moisture Quantity | | Adjustment |
| Total | | 100 |

TEGmBE (triethylene glycol monobutyl ether)

In Table 1, materials having a description other than the compound name are as follows.

Pigment (S170 (for self-dispersing black ink), C.I. Pigment Blue 15:4 (for self-dispersing cyan ink), C.I. Pigment Red 122 (for self-dispersing magenta ink), or C.I. Pigment Yellow 74 (for resin-dispersion yellow ink) was used for each of the inks)

Surfynol 104 (merchandise name, manufactured by Nissin Chemical Co., Ltd., acetylene glycol corresponding to the formula (1), 2,4,7,9-tetramethyl-5-decyne-4,7-diol)

Olfine E1004 (merchandise name, manufactured by Nissin Chemical Co., Ltd., ethylene oxide adduct of acetylene glycol corresponding to the formula (2))

Olfine E1010 (merchandise name, manufactured by Nissin Chemical Co., Ltd., ethylene oxide adduct of acetylene glycol corresponding to the formula (2), and ethylene oxide adduct of 2,4,7,9-tetramethyl-5-decyne-4,7-diol (the number of moles of added ethylene oxide: 10))

3.2. Evaluation Test

The following evaluation test was performed by using a sample which was obtained in the following manner. Firstly, a recording head of an ink jet printer PX-M7050F (manufactured by Seiko Epson Corporation) was modified to be a line head. Modification was performed so as to change a speed in a sheet transporting path, and a test for an interval between simplex printing and duplex printing was performed. Then, an ink cartridge filled with the inks prepared as described above was mounted in the printer and each of the inks was discharged from nozzles of the recording head. Thus, an image was recorded on a recording medium.

3.2.1. Status of Sheet Transporting

The N6A.Tif pattern of J color digital reference image data ISO/JIS-SCID was printed on both surfaces of A4 Business plain paper (manufactured by Seiko Epson Corporation). The printing was performed on the total 200 pages of the total 100 pieces of paper, and it was determined whether or not paper jam occurred. Evaluation criteria are as follows.

A: no paper jam during one second from when printing on the front surface is started until printing on the back surface is started B: no paper jam during three seconds from when printing on the front surface is started until printing on the back surface is started C: paper jam occurs during three seconds from when printing on the front surface is started until printing on the back surface is started 3.2.2. Transfer of Ink to Duplex Transporting Roller The N6A.Tif pattern of color digital reference image data ISO/JIS-SCID was printed on both surfaces of A4 Business plain paper (manufactured by Seiko Epson Corporation). The printing was performed on the total 200 pages of the total 100 pieces of paper, and it was determined whether or not a trace on the duplex transporting roller which performed transfer of an ink adhered to the paper. Evaluation criteria are as follows.

A: adhering of a trace of the duplex transporting roller is not confirmed

B: adhering of a trace of the duplex transporting roller is confirmed slightly.

C: adhering of a trace of the duplex transporting roller is confirmed 3.2.3. Presence or Absence of Permanent Curling The N6A.Tif pattern of J color digital reference image data ISO/JIS-SCID was printed on the entirety of one surface of A4 Business plain paper (manufactured by Seiko Epson Corporation). The paper was left at 24° C. at humidity of 40% for 24 hours, and then it was determined whether or not curling occurred in four edges of the A4 paper. Evaluation criteria are as follows.

A: the height of the curling is less than 2 cm

B: the height of the curling is equal to or more than 2 cm 3.3. Evaluation Results Table 2 shows results of the above-described evaluations. Regarding the self-dispersing black ink and the resin-dispersion yellow ink, in a case where the moisture quantities thereof were equal to or less than 73 mass %, any ink did not cause the occurrence of paper jam during one second from when printing on the front surface was started until printing on the back surface was started. When the moisture quantities thereof were 74 mass % and 75 mass %, any ink did not cause the occurrence of paper jam during three seconds from when printing on the front surface was started until printing on the back surface was started. On the contrary, when the moisture quantities thereof were equal to or more than 76 mass %, the paper jam occurred during three seconds from when printing on the front surface was started until printing on the back surface was started. Regarding the transfer of an ink to the duplex transporting roller, when the moisture quantities thereof were equal to or less than 67 mass %, the transfer of an ink was confirmed. However, when the moisture quantities thereof were 68 mass % and 69 mass %, the transfer of an ink was slightly confirmed. When the moisture quantities thereof were equal to or more than 70 mass %, the transfer of an ink was not confirmed. Regarding the presence or the absence of the permanent curling, the self-dispersing black ink did not cause the permanent curling to occur when the moisture quantity thereof was equal to or less than 72 mass %. The resin-dispersion yellow ink did not cause the permanent curling to occur when the moisture quantity thereof was equal to or less than 73 mass %. Thus, regarding the self-dispersing black ink and the resin-dispersion yellow ink, in a case where the moisture quantities thereof were from 68 mass % to mass %, it was understood that the sheet transporting properties were good, and the occurrence of the transfer of an ink to the duplex transporting roller was suppressed.

Regarding the self-dispersing cyan ink and the self-dispersing magenta ink, in a case where the moisture quantities thereof were equal to or less than 70 mass %, any ink did not cause the occurrence of paper jam during one second from when printing on the front surface was started until printing on the back surface was started. When the moisture quantities thereof were 71 mass % and 72 mass %, any ink did not cause the occurrence of paper jam during three seconds from when printing on the front surface was started until printing on the back surface was started. On the contrary, when the moisture quantities thereof were equal to or more than 73 mass %, the paper jam occurred during three seconds from when printing on the front surface was started until printing on the back surface was started. Regarding the transfer of an ink to the duplex transporting roller, when the moisture quantities thereof were equal to or less than 61 mass %, the transfer of an ink was confirmed. However, when the moisture quantities thereof were from 62 mass % to 65 mass %, the transfer of an ink was slightly confirmed. When the moisture quantities thereof were equal to or more than 66 mass %, the transfer of an ink was not confirmed. Regarding the presence or the absence of the permanent curling, when the moisture quantity thereof were equal to or less than 74 mass %, the permanent curling did not occur. Thus, regarding the self-dispersing cyan ink and the self-dispersing magenta ink, in a case where the moisture quantities thereof were from 62 mass % to 72 mass %, it was understood that the sheet transporting properties were good, and the occurrence of the transfer of an ink to the duplex transporting roller was suppressed.

TABLE 2

| | | Moisture quantity [mass %] | | | | | | | | | | | | | |
|---|---|---|---|---|---|---|---|---|---|---|---|---|---|---|---|
| | | 57 | 58 | 59 | 60 | 61 | 62 | 63 | 64 | 65 | 66 | 67 | 68 | 69 | 70 |
| Self-dispersing black | Status of sheet transporting | A | A | A | A | A | A | A | A | A | A | A | A | A | A |
| | Transfer of ink to duplex transporting roller | C | C | C | C | C | C | C | C | C | C | C | B | B | A |
| | Permanent curling | B | B | B | B | B | B | B | B | B | B | B | B | B | B |
| Self-dispersing cyan | Status of sheet transporting | A | A | A | A | A | A | A | A | A | A | A | A | A | A |
| | Transfer of ink to duplex transporting roller | C | C | C | C | C | B | B | B | B | A | A | A | A | A |
| | Permanent curling | B | B | B | B | B | B | B | B | B | B | B | B | B | B |
| Self-dispersing magenta | Status of sheet transporting | A | A | A | A | A | A | A | A | A | A | A | A | A | A |
| | Transfer of ink to duplex transporting roller | C | C | C | C | C | B | B | B | B | A | A | A | A | A |
| | Permanent curling | B | B | B | B | B | B | B | B | B | B | B | B | B | B |
| Resin-dispersion yellow | Status of sheet transporting | A | A | A | A | A | A | A | A | A | A | A | A | A | A |
| | Transfer of ink to duplex transporting roller | C | C | C | C | C | C | C | C | C | C | C | B | B | A |
| | Permanent curling | B | B | B | B | B | B | B | B | B | B | B | B | B | B |

| | | Moisture quantity [mass %] | | | | | | | | | | | | | |
|---|---|---|---|---|---|---|---|---|---|---|---|---|---|---|---|
| | | 71 | 72 | 73 | 74 | 75 | 76 | 77 | 78 | 79 | 80 | 81 | 82 | 83 | 84 |
| Self-dispersing black | Status of sheet transporting | A | A | A | B | B | C | C | C | C | C | C | C | C | C |
| | Transfer of ink to duplex transporting roller | A | A | A | A | A | A | A | A | A | A | A | A | A | A |
| | Permanent curling | B | B | C | C | C | C | C | C | C | C | C | C | C | C |
| Self-dispersing cyan | Status of sheet transporting | B | B | C | C | C | C | C | C | C | C | C | C | C | C |
| | Transfer of ink to duplex transporting roller | A | A | A | A | A | A | A | A | A | A | A | A | A | A |
| | Permanent curling | B | B | B | B | C | C | C | C | C | C | C | C | C | C |
| Self-dispersing magenta | Status of sheet transporting | B | B | C | C | C | C | C | C | C | C | C | C | C | C |
| | Transfer of ink to duplex transporting roller | A | A | A | A | A | A | A | A | A | A | A | A | A | A |
| | Permanent curling | B | B | B | B | C | C | C | C | C | C | C | C | C | C |
| Resin-dispersion yellow | Status of sheet transporting | A | A | A | B | B | C | C | C | C | C | C | C | C | C |
| | Transfer of ink to duplex transporting roller | A | A | A | A | A | A | A | A | A | A | A | A | A | A |
| | Permanent curling | B | B | B | C | C | C | C | C | C | C | C | C | C | C |

3.4. Examination of Speeding-Up of Duplex Printing

Next, speeding-up of duplex printing was examined. In a case where duplex printing was performed by using an ink of four colors, in a state where an interval from when printing on the front surface is started until printing on the back surface is started was set to be one second to ten seconds, it was examined whether or not paper jam occurred. The N6A.Tif pattern of J color digital reference image data ISO/JIS-SCID was printed on both surfaces of the following three types of recording mediums. The printing was performed on the total 200 pages of the total 100 pieces of paper, and it was determined whether or not paper jam occurred. Evaluation criteria are as follows.

A: no paper jam
B: paper jam occurs

The used recording media are as follows.

Plain paper A (merchandise name "plain paper with both surfaces of high quality", manufactured by Seiko Epson Corporation)

Plain paper B (merchandise name "CopyPlusPaper", manufactured by Hammermill Corporation)

Fine coating paper for printing (merchandise name "OK Topcoat+", manufactured by Oji Paper Co., Ltd.)

Regarding Example 1 and Comparative Example 1, in a case where duplex printing was performed at a duplex printing speed (pages/minute) of the plain paper A which was set to be from 0% of a simplex printing speed to 100% thereof, it was examined whether or not paper jam occurred.

3.5. Evaluation Results

Tables 3 and 4 show results of the above-described evaluations. As shown in Table 3, in Examples 1 and 2 in which the moisture quantity of the ink of four colors was 70 mass %, no paper jam occurred even when the interval from when printing on the front surface was started until printing on the back surface was started was one second, and it was understood that the speeding-up of the duplex printing was possible. On the contrary, in Comparative Example 1 in which the moisture quantity of the ink of four colors was more than the range in the invention, and in Comparative Example 2 in which the moisture quantity of the ink of four colors was less than the range in the invention, the paper jam did not occur when the interval from when printing on the front surface was started until printing on the back surface was started was equal to or longer than four seconds, but the paper jam occurred when the interval was equal to or shorter than three seconds. If the above results were compared to the results of Examples 1 and 2, the speeding-up of the duplex printing was not possible. As described as the experimental example, in a case where fine coating paper for printing was used as a recording medium, an ink was not infiltrated to the recording medium. Thus, even when the interval from when printing on the front surface was started until printing on the back surface was started was ten seconds, the paper jam occurred.

Table 4 shows results indicated by a ratio of the duplex printing speed to the simplex printing speed. In Example 1 in which the moisture quantity of the ink of four colors was 70 mass %, no paper jam occurred, and even when the duplex printing speed did not become slow, no paper jam occurred. However, in Comparative Example 1 in which the moisture quantity of the ink of four colors was more than the range in the invention, if the duplex printing speed was set not to be reduced to be equal to or less than 20% of the simplex printing speed, the paper jam occurred.

In this manner, in a case where the moisture quantity of the ink is included in the range in the invention, it was understood that the speeding-up of the duplex printing was possible even in full-color printing in which the amount of adhered ink is large. In this manner, it was understood that high-speed duplex printing as fast as that of a laser printer was possible even when the moisture quantity is defined based on the type of a pigment, setting as a composition according to the invention was performed, and thus a line type ink jet printer was used.

TABLE 3

| ← Duplex printing speeding-up | | | | | | | | | | |
|---|---|---|---|---|---|---|---|---|---|---|
| | Interval between simplex printing and duplex printing [second] | | | | | | | | | |
| | 1 | 2 | 3 | 4 | 5 | 6 | 7 | 8 | 9 | 10 |
| Example 1 Moisture quantity of ink of four colors, which is constantly 70% Plain paper A | A | A | A | A | A | A | A | A | A | A |
| Example 2 Moisture quantity of ink of four colors, which is constantly 70% Plain paper B | A | A | A | A | A | A | A | A | A | A |
| Comparative Example 1 Moisture quantity of ink of four colors, which is constantly 74% Plain paper A | B | B | B | A | A | A | A | A | A | A |
| Comparative Example 2 Moisture quantity of ink of four colors, which is constantly 66% Plain paper A | B | B | B | A | A | A | A | A | A | A |

TABLE 3-continued

| ← Duplex printing speeding-up | | | | | | | | | | |
|---|---|---|---|---|---|---|---|---|---|---|
| | Interval between simplex printing and duplex printing [second] | | | | | | | | | |
| | 1 | 2 | 3 | 4 | 5 | 6 | 7 | 8 | 9 | 10 |
| Experimental Example Moisture quantity of ink of four colors, which is constantly 70% Fine coating paper for printing | B | B | B | B | B | B | B | B | B | B |

TABLE 4

| | Speed [%] in duplex printing (in comparison to speed in simplex printing) | | | | | | | | | | |
|---|---|---|---|---|---|---|---|---|---|---|---|
| | 100 | 90 | 80 | 70 | 60 | 50 | 40 | 30 | 20 | 10 | 0 |
| Example 1 Moisture quantity of ink of four colors, which is constantly 70% Plain paper A | A | A | A | A | A | A | A | A | A | A | A |
| Comparative Example 1 Moisture quantity of ink of four colors, which is constantly 74% Plain paper A | B | B | B | B | B | B | B | B | A | A | A |

As described above, according to the embodiment, the moisture quantity of the ink constituting an ink set is adjusted, and thus it is possible to provide an ink set which can suppress the occurrence of transfer of the ink and deformation of a sheet, and can cause a speed of duplex printing to be increased.

The invention is not limited to the above-described embodiment, and various modifications may be applied. For example, the invention includes a configuration (for example, configuration having the same function, the same method, and the same results, or configuration having the same object and the same effects) which is substantially the same as the configuration described in the embodiment. The invention includes a configuration obtained by substituting a component which is not fundamental component in the configuration described in the embodiment. The invention includes a configuration which can exhibit the same advantages effects the same as those of the configuration described in the embodiment, or can achieve the same object. The invention includes a configuration obtained by adding well-known technologies to the configuration described in the embodiment.

This application claims priority to Japanese Patent Application No. 2015-128360 filed on Jun. 26, 2015. The entire disclosure of Japanese Patent Application No. 2015-128360 are hereby incorporated herein by reference.

What is claimed is:

1. An ink set which contains at least one selected from a group of a black pigment ink, a self-dispersing color pigment ink, and a resin-dispersion color pigment ink, wherein
a moisture quantity of the black pigment ink is from 68 mass % to 75 mass %,
a moisture quantity of the self-dispersing color pigment ink is from 62 mass % to 72 mass %, and a moisture quantity of the resin-dispersion color pigment ink is from 68 mass % to 75 mass %, each of the black pigment ink, the self-dispersing color pigment ink, and the resin-dispersion color pigment ink further contains an alkylene glycol monoalkyl ether in an amount that ranges between 0.5 mass % to 6 mass %, each of the black pigment ink, the self-dispersing color pigment ink, and the resin-dispersion color pigment ink further contains trimethylglycine, wherein each of the black pigment ink, the self-dispersing color pigment ink, and the resin-dispersion color pigment ink contains three or more types of acetylene glycol-based surfactants selected from a group of acetylene glycol and an ethylene oxide adduct of acetylene glycol, and the total content of the acetylene glycol-based surfactants is from 0.1 mass % to 3 mass % with respect to the total mass of each of the black pigment ink, the self-dispersing color pigment ink, and the resin-dispersion color pigment ink.

2. The ink set according to claim 1, wherein the ink set is used for a duplex-printing ink jet recording apparatus.

3. The ink set according to claim 1, wherein the viscosity of each of the black pigment ink, the self-dispersing color pigment ink, and the resin-dispersion color pigment ink is from 2.0 mm$^2$/s to 4.0 mm$^2$/s.

4. The ink set according to claim 1, wherein each of the black pigment ink, the self-dispersing color pigment ink, and the resin-dispersion color pigment ink further contains 1,2-alkane diol.

5. An ink set, wherein a moisture quantity of a black pigment ink is from 68 mass % to 75 mass %, a moisture quantity of a self-dispersing color pigment ink is from 62 mass % to 72 mass %, and a moisture quantity of a resin-dispersion color pigment ink is from 68 mass % to 75 mass %, each of the black pigment ink, the self-dispersing color pigment ink, and the resin-dispersion color pigment ink further contains an alkylene glycol monoalkyl ether in an amount that ranges between 0.5 mass % to 6 mass %, each of the black pigment ink, the self-dispersing color pigment ink, and the resin-dispersion color pigment ink further contains trimethylglycine, wherein each of the black pigment ink, the self-dispersing color pigment ink, and the resin-dispersion color pigment ink contains three or more types of acetylene glycol-based surfactants selected from a group of acetylene glycol and an ethylene oxide adduct of acetylene glycol, and the total content of the acetylene glycol-based surfactants is from 0.1 mass % to 3 mass % with respect to the total mass of each of the black pigment ink, the self-dispersing color pigment ink, and the resin-dispersion color pigment ink.

6. The ink set according to claim 1, wherein the black pigment ink is formed from a self-dispersing pigment.

* * * * *